United States Patent
Dahanayake et al.

(10) Patent No.: US 8,851,187 B2
(45) Date of Patent: Oct. 7, 2014

(54) METHOD FOR MOBILITY CONTROL IN OIL-BEARING CARBONATE FORMATIONS

(75) Inventors: Manilal Dahanayake, Princeton Junction, NJ (US); Max Chabert, Bordeaux (FR); Mikel Morvan, Pessac (FR); David Sorin, Versailles (FR)

(73) Assignee: Rhodia, Inc., Cranbury, NJ (US)

( * ) Notice: Subject to any disclaimer, the term of this patent is extended or adjusted under 35 U.S.C. 154(b) by 145 days.

(21) Appl. No.: 13/331,326

(22) Filed: Dec. 20, 2011

(65) Prior Publication Data

US 2012/0186810 A1 Jul. 26, 2012

Related U.S. Application Data

(60) Provisional application No. 61/426,736, filed on Dec. 23, 2010.

(51) Int. Cl.
| | |
|---|---|
| E21B 43/16 | (2006.01) |
| E21B 43/22 | (2006.01) |
| E21B 43/26 | (2006.01) |
| E21B 33/13 | (2006.01) |
| C09K 8/584 | (2006.01) |

(52) U.S. Cl.
CPC ........................... C09K 8/584 (2013.01)
USPC ........ 166/372; 166/270.1; 166/271; 166/281; 166/308.1

(58) Field of Classification Search
None
See application file for complete search history.

(56) References Cited

U.S. PATENT DOCUMENTS

| | | | |
|---|---|---|---|
| 2,792,894 A | 5/1957 | Graham et al. | |
| 4,364,431 A | 12/1982 | Saidi et al. | |
| 4,842,065 A | 6/1989 | McClure | |
| 5,247,993 A | 9/1993 | Sarem et al. | |
| 5,297,628 A * | 3/1994 | Jennings | 166/281 |
| 2007/0107897 A1* | 5/2007 | Dahanayake et al. | 166/271 |
| 2007/0215347 A1 | 9/2007 | Tang | |
| 2009/0023618 A1* | 1/2009 | Futterer et al. | 507/237 |

OTHER PUBLICATIONS

Hirasaki, et al., "Surface Chemistry of Oil Recovery from Fractured, Oil-Wet, Carbonate Formations", SPEJournal, Jun. 2004, pp. 151-162.
Austad, et al., Spontaneous Imbibition of Water into Oil-Wet Carbonates, Journal of Petroleum Science and Engineering, 2003, vol. 39, No. 3, pp. 363-376 (abstract only).
Weiss, et al., "Artificial Intelligence Used to Evaluate 23 Single-Well Surfactant-Soak Treatments", SPE Reservoir Evaluation & Engineering, Jun. 2006, vol. 9, No. 3, pp. 209-216 (abstract only).
Austad, T., et al., "Spontaneous Imbibition of Water into Oil-Wet Carbonates," Journal of Petroleum Science and Engineering, 2003, vol. 39, No. 3, pp. 363-376.
Weiss,W.W., et al., "Artificial Intelligence Used to Evaluate 23 Single-Well Surfactant-Soak Treatments," SPE Reservoir Evaluation & Engineering, Jun. 2006, vol. 9, No. 3, pp. 209-216.
International Preliminary Report on Patentability dated on Jun. 25, 2013 corresponding to PCT/US2011/066086, 7 pp.
International Search Report and Written Opinion dated Mar. 15, 2013 corresponding to International Patent Application No. PCT/US2011/066086.

* cited by examiner

*Primary Examiner* — Zakiya W Bates
(74) *Attorney, Agent, or Firm* — Ohlandt, Greeley, Ruggiero & Perle, LLP

(57) ABSTRACT

A method for enhancing recovery of oil from an oil-bearing carbonate formation within a reservoir. The method has the steps of (a) introducing a viscous gel under pressure into the oil-bearing carbonate formation and (b) extracting oil. The aqueous viscous gel has water and an amount of a non-polymeric viscosifying surfactant sufficient to provide the flooding fluid with an oil/water interfacial surface tension of about 10 mN/m or less and a viscosity of about 10 cP or more of the one or more non-polymeric surfactants. The one or more non-polymeric, viscosifying surfactants is selected from the group of one or more cationic surfactants, one or more zwitterionic surfactants, one or more anionic surfactants, one or more amphoteric surfactants, and combinations thereof. In a preferred embodiment, the aqueous viscous gel is also substantially free of solids.

18 Claims, No Drawings

METHOD FOR MOBILITY CONTROL IN OIL-BEARING CARBONATE FORMATIONS

BACKGROUND OF THE DISCLOSURE

1. Field of the Disclosure

The present disclosure relates to a method for enhancing recovery of oil from an oil-bearing carbonate/dolomite formation.

2. Description of the Related Art

Many reservoirs from which oil and gas are produced are not homogeneous in the geologic properties (e.g. porosity and permeability). In fact, many of such reservoirs, especially those consisting of carbonate type of rocks (e.g. limestone and dolomite) are naturally and significantly fractured. In addition, in carbonate reservoirs the rock matrix is often naturally fractured.

Carbonate reservoirs consist of two distinct elements: a fracture network and a microporous matrix. The fracture network is a series of interconnected cracks that can transmit fluids easily (very high permeability), but make up only a small fraction of the total porosity. The microporous matrix consists of the oil-bearing porous rock that typically exhibits much lower permeability than the fracture network but has the bulk of the total porosity of the reservoir. Hydrocarbon production is normally less efficient in fractured reservoirs. During primary production, the natural reservoir pressures to produce the oil in place will quickly decrease and more than 90% of the original oil in still left in place trapped in mostly in microporous matrix. Similarly, conventional methods of secondary recovery fail to displace substantial volumes of "left-in-place" oil.

Conventional waterflooding techniques exhibit relatively low efficiency in highly fractured reservoirs. Waterflooding in these reservoirs is characterized by early water breakthrough and rapidly increasing water-oil ratios to an uneconomic level. The injected water tends to travel only through the fractures and not interact with the oil trapped in rock matrix. The injected water cannot penetrate into the matrix and thereby displace and recover oil trapped in the microporous matrix. The injected water tends to recover only the oil left behind in the fracture system following primary production. The injected water has little or no interaction with oil trapped in the microporous matrix as the matrix is not water-wet. The microporous matrix does not spontaneously imbibe or absorb water and the injected water is most mobile through high-permeability fracture network and not the low-permeability microporous matrix where most of oil is trapped.

One approach to increase the penetration of a water phase into the microporous matrix has been to add a surfactant to the water to modify the wettability of the carbonate formation from oil-wet to water-wet. Previous research and field experience has demonstrated that including a low concentration of the properly selected surfactant to the water will reduce the interfacial tension and also create now a water-wet condition in the area near the fracture face. With this altered condition, the aqueous phase then penetrates some distance into the microporous matrix and thereby pushes out some of the oil that was within the pore spaces. In this countercurrent imbibition process, the oil that is displaced from the matrix then moves into the fracture network. Once pushed into the fracture network, the oil can be moved easily to a production well. In a countercurrent imbibition process, with or without the addition of a water-wetting surfactant, the rate of oil recovery is dependent upon the capillary pressure characteristics of the porous rock matrix. That is, the imbibition process is essentially unaffected by conventional techniques for controlling field operations, such as selecting pressures and flow rates.

Techniques for using surfactants in oil recovery in carbonate formation are disclosed by G. Hirasaki and D. L. Zhang in "Surface Chemistry of Oil Recovery from Fractured, Oil-Wet Carbonate Formations" (2000); by Austad and Standes in "Spontaneous Imbibition of Water into Oil-Wet Carbonates", *Journal of Petroleum Science and Engineering*, vol. 39, pp. 363-376, (2003); by W. W. Weiss in "Artificial Intelligence Used to Evaluate 23 Single-Well Surfactant Soak Treatments", *SPE Reservoir Evaluation & Engineering*, June 2006; U.S. Pat. Nos. 2,792,894; 4,364,431; 4,842,065; 5,247, 993; and U.S. Published Patent Application No. 2007/0215347 A1.

Another approach to increase the penetration of a water phase with the matrix blocks containing trapped oil has been to inject foam under pressure into the oil-bearing carbonate formation. The foam is formed by aeration of a mixture of surfactant and water. The foam exhibits high apparent viscosity, which reduces the mobility of the water/surfactant solutions into large fractures or high-permeability zones effectively closing them off and/or providing a barrier to entry. With the altered condition, a subsequently introduced foam and/or a surfactant solution generated by the collapse of the original foam is able to penetrate into the microporous matrix acting to reduce the interfacial surface tension (IFT) between water and the oil in the microporous matrix thereby mobilizing the oil.

A problem with the use of foams for mobility control is the inherent short life of the foams. The foams dissipate relatively quickly diminishing their efficacy in blocking large fractures and any enhancement in oil recovery.

Another difficulty in recovering oil from fractured reservoirs or carbonate formations is compromise of internal pressure from adjacent gas-bearing formations referred to as "gas caps." As oil is recovered from oil-bearing formations, pressure loss is encountered and gas seeps or permeates into the oil-bearing formations from the adjacent gas-bearing formations. The infiltration of gas pushes downward oil in the oil-bearing formations making the oil more difficult to extract.

It would be desirable to have a method for enhancing the transport and permeation of aqueous fluids through the microporous matrix of oil-bearing carbonate formations while substantially reducing or preventing transport and permeation through the natural fracture network. It would also be desirable to have a method for substantially reducing or preventing invasive permeation of gas from adjacent formations through the fracture network. It would also be desirable to have a method for enhancing the recovery of oil from oil-bearing carbonate formations and reservoirs.

SUMMARY OF THE DISCLOSURE

According to the present disclosure, there is a method for enhancing recovery of oil from an oil-bearing carbonate formation within a reservoir. The method has the steps of (a) introducing a viscous gel under pressure into the oil-bearing carbonate formation and (b) extracting oil through a wellbore and/or injection well into the reservoir. The viscous gel includes water and an amount of one or more non-polymeric surfactants sufficient to provide a flooding fluid with an oil/water interfacial surface tension of about 10 mN/m or less and a viscosity of about 5 cP or more of the one or more non-polymeric surfactants. The one or more non-polymeric surfactants is selected from the group of one or more cationic surfactants, one or more zwitterionic surfactants, one or more anionic surfactants, one or more amphoteric surfactants, and combinations thereof. In a preferred embodiment, the aqueous viscous gel is substantially free of solids.

DETAILED DESCRIPTION OF THE DISCLOSURE

In the method of the present disclosure, a viscous gel having an amount of a viscous gel having one or more non-polymeric surfactants is introduced, e.g., injected, into a reservoir or a naturally-fractured carbonate formation at elevated pressure for the purpose of pushing or expelling oil from it. The viscous gel enters and settles within the large fractures of the carbonate formation fracture network and essentially acts as a barrier to entry in the fracture network. When the fracture network is effectively or substantially plugged, the viscous gel permeates into the microporous matrix of the carbonate formation instead of the fracture network. The viscous gel preferentially compatibilizes with the oil entrapped in the matrix and pushes it into the fracture network, where it can be easily recovered by conventional means. Further, the viscous gel will impart pressure on injection points of injection wells preventing the flow of gas from infiltrating the oil-bearing zones and preventing the pushing of oil below the production wells.

The viscous gel acts to lower the IFT between the viscous gel and oil entrapped in the matrix of the carbonate formation and increase the viscosity of the injected water during treatment. The surfactant induces the formation of oil/water mixtures as the viscous gel mixes with oil within the reservoir or formation. At the same time, the surfactant induces a viscosity increase in the viscous gel to more effectively push and/or transport the oil/water mixture or emulsion through the microporous matrix of the carbonate formation to the fracture network, where it is easily withdrawn or extracted. The presence of these surfactants in the viscous gel imparts a markedly higher viscosity compared to a viscous gel without such surfactants. Higher viscosity in the viscous gel enhances the capability of pushing or expelling oil from the formation such that the use of conventional polymers, e.g. polyacrylamide (PAM), may be reduced or completely eliminated. The higher viscosity in the viscous gel also allows it to settle within the fracture network and act as an effective barrier to transport therein. The extent of viscosity increase will vary considerably depending on many factors, including surfactant type and amount, brine content in the viscous gel and in the formation, composition and physical characteristics of the oil in the formation, and impurities in the viscous gel. The viscous gel will have sufficient surfactant present to provide a viscosity of about 5 cP or more, more preferably about 25 cP or more, and most preferably about 50 cP or more. In practice, viscous gel viscosities of about 5 cP to about 1000 cP will be typical. Viscosity is measured in the flooding fluid as introduced into the reservoir and at a shear rate of about 10 reciprocal seconds ($s^{-1}$) and at temperature of 25° C.

The aqueous viscous gel is introduced under pressure into the oil-bearing carbonate formation preferably for one or more days and more preferably for three to five days. A residence period is preferably observed to allow the viscous gel more time to permeate into the matrix or porous forming portions of the carbonate formation. The residence time is preferably one or more days, more preferably one to ten days, and most preferably three to five days. Oil extraction is preferably commenced one or more days, more preferably one to ten days, and most preferably three to five days after the introduction has ended.

As used herein, the term "reservoir" is inclusive of the term "oil-bearing carbonate formation" as such a formation is typically located within a reservoir. One or more wellbores may be located in the vicinity of the reservoir and/or formation for the purpose of extracting oil. The viscous gel may be introduced through a wellbore or other protrusion, drill hole, injection point, or opening into the reservoir. The term "wellbore" as used herein is deemed inclusive of the various locations of introduction. The viscous gel will be introduced at an elevated pressure sufficient to ensure substantial infiltration of the viscous gel into the fracture network of the carbonate formation and substantial wetting of exposed surfaces of the microporous matrix of such formation. Oil may be extracted at the same or a different location than the location of the point of introduction of the viscous gel.

Useful non-polymeric surfactants include cationic, amphoteric, zwitterionic surfactants, and anionic surfactants. Non-polymeric surfactants that form viscosifying aqueous fluids are advantageous because they typically are, as a class, of lower molecular weight than polymers. Amphoteric surfactants have both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic). Zwitterionic surfactants have a permanently positively charged moiety in the molecule regardless of pH and a negatively charged moiety at alkaline pH. Cationic surfactants have a permanently positively charged moeity in the molecule regardless of pH. Anionic surfactants have a permanently negatively charged moiety except at very acidic pH.

The surfactants are present in the viscous gel at an amount sufficient to provide the viscous gel (prior to injection into the formation or reservoir) with an interfacial surface tension (IFT) of about 10 mN/m or less, preferably about 1 mN/m or less, and most preferably about 0.1 or less. IFT is determined by spinning drop tensiometer or pendant drop depending on IFT value. The surfactants are preferably present in the viscous gel at an amount about 0.1 to about 10 wt % and most preferably about 0.5 to about 6 wt % based on the total weight of the viscous gel. The amount of surfactant necessary will vary considerably depending on factors, including surfactant type, brine content in the fluid, and impurities in the viscous gel. The surfactants are effective in providing the desired levels of IFT even in viscous gels having high salinity, i.e. up to about 20 lbs/1000 gallons concentration. Salts may be organic or inorganic salts, including monovalent, divalent, and trivalent species. Inorganic salts commonly encountered in brackish and salt water include, but are not limited to, chloride and bromide salts of potassium, sodium, calcium, magnesium, zinc, iron, and ammonium.

The viscosifying surfactants useful in the method of the present disclosure are those that form viscous gels at very low concentrations. Although not bound by any theory, the viscous gel behavior is believed to be result from a different type of micelle formation than the usual spherical micelles formed by most surfactants. The surfactants form worm-like, rod-like or cylindrical micelles in solution that remain stable in high shear applications, i.e., do not irreversibly degrade under high shear. The configuration of the surfactants allows fluids containing them to be injected into the reservoir at relatively low shear, i.e., with relatively low expenditure of energy but revert to relatively high viscosity within the reservoir and/or carbonate formation upon relaxation of shearing In one embodiment of the disclosure, the viscous surfactant gel may also be viscoelastic depending on type and level of the non-polymeric surfactant. Viscoelastic viscous gels are preferred.

The property of viscoelasticity in general is well known and reference is made to S. Gravsholt, Journal of Coll. and Interface Sci., 57(3), 575 (1976); Hoffmann et al., "Influence of Ionic Surfactants on the Viscoelastic Properties of Zwitterionic Surfactant Solutions", Langmuir, 8, 2140-2146

91992); and Hoffmann et al., The Rheological Behaviour of Different Viscoelastic Surfactant Solutions, Tenside Surf. Det, 31, 289-400, 1994. Of the test methods specified by these references to determine whether a liquid possesses viscoelastic properties, one test that has been found to be useful in determining the viscoelasticity of an aqueous solution consists of swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" at some point or over some range of points below about 10 rad/sec, typically between about 0.001 to about 10 rad/sec, more typically between about 0.1 and about 10 rad/sec, at a given temperature and if G'>$10^{-2}$ Pascals, preferably $10^{-1}$ Pascals, the fluid is typically considered viscoelastic at that temperature. Rheological measurements such as G' and G" are discussed more fully in "Rheological Measurements", Encyclopedia of Chemical Technology, vol. 21, pp. 347-372, (John Wiley & Sons, Inc., N.Y., N.Y., 1997, 4th ed.). The above disclosures are expressly incorporated herein by reference.

Non-polymeric viscosifying cationic surfactants useful in the method of the present disclosure include those selected from i) certain quaternary salts and ii) certain amines, iii) certain amine oxides, and iv) combinations thereof. Representative cationic surfactants are set forth below.

The quaternary salts have the structural formula:

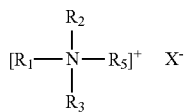

wherein $R_1$ is a hydrophobic moiety of alkyl, alkylarylalkyl, alkoxyalkyl, alkylaminoalkyl or alkylamidoalkyl, and wherein $R_1$ has from about 16 to about 24 carbon atoms and may be branched or straight-chained and saturated or unsaturated.

$R_2$ and $R_3$ are, independently, i) an aliphatic group or ii) an aliphatic group with an aromatic or benzylic moiety bonded therewith. $R_2$, $R_3$, and $R_5$ have from 1 to about 20 atoms. The aliphatic group can be branched or straight-chained and saturated or unsaturated. $R_2$, $R_3$, and $R_5$ can be, for example, alkyl, oxyalkyl, polyoxyalkyl, alkoxy, and alkylaryl. Preferably, $R_2$, $R_3$, and $R_5$ are alkyl groups. Most preferably, $R_2$, $R_3$, and $R_5$ are methyl or ethyl groups.

X is suitable counter-anion, such as Cl$^-$, Br$^-$, and $CH_3CH_3SO_4^-$.

The amines have the following structural formula:

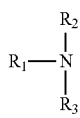

wherein $R_1$, $R_2$ and $R_3$ are as defined above.

Representative amines of the above structure include polyoxyethylenated (2-15) cocoalkylamines, polyoxyethylenated (12-18) tallow alkylamines, and polyoxyethylenated (2-15) oleyl and erucyl amines Examples of non-polymeric viscosifying anionic surfactants useful in the method of the present disclosure include those represented by the formulas (I) to (V) as well as mixtures thereof:

$ROSO_3^-$ (I)

$R((OCH_2CH_2)_m(OCH_2CHCH_3)_n)_pOSO_3^-$ (II)

$RSO_3^-$ (III)

$R((OCH_2CH_2)_{m'}(OCH_2CHCH_3)_{n'})_{p'}OCH_2CH(OH)CH_2SO_3^-$ (IV)

$RC_6H_4-SO_3^-$ (V)

wherein R represents an alkyl, alkenyl, arylalkyl, or hydroxyalkyl group, each of m, n, m', and n' is independently an integer of from 0 to about 50 and p and p' are each integers of from 1 to about 25. R has about 16 to about 24 carbon atoms and more preferably about 16 to about 20 carbon atoms. R may be saturated or unsaturated, branched or straight chained, wherein branch alkyl groups have from 1 to about 6 carbon atoms. Representative alkyl groups for R include decyl, dodecyl, tetradecyl (myristyl), hexadecyl (cetyl), octadecyl (oleyl), stearyl, erucyl, and the derivatives of coco, tallow, soy, and rapeseed oils.

In one embodiment of the compound according to formula (II), m and n are each 0. In another embodiment of the compound according to formula (II), one of m and n is 0 and the other is non-zero. In another embodiment of the compound according to formula (II), m and n are each non-zero. In one embodiment of the compound according to formula (IV), m' and n' are each 0. In another embodiment of the compound according to formula (IV), one of m' and n' is 0 and the other is non-zero. In another embodiment of the compound according to formula (IV), m' and n' are each non-zero.

If both types of alkyleneoxy units are present in the compounds according to structures (II) or (IV), that is, if m and n of the compound according to structure (II) are each non-zero, or if m' and n' of the compound according to structure (IV) are each non-zero, then such alkyleneoxy groups may be in arranged in alternating, random, or block order.

In one embodiment, the total number of alkyleneoxy groups per molecule, that is, in the case of the compound according to formula (II), the sum of the number of alkyleneoxy groups, (m+n), for the number of units, p, of such alkyleneoxy groups, and in the case of the compound according to formula (IV), the sum the number of alkyleneoxy groups, (m'+n'), for the number of units, p', of such alkyleneoxy groups, ranges from 0 to about 35 and more preferably 0 to about 10.

Examples of non-polymeric, viscosifying zwitterionic surfactants useful in the method of the present disclosure are represented by the formula:

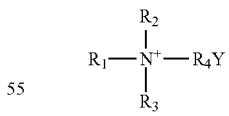

wherein $R_1$ represents a hydrophobic moiety of alkyl, alkylarylalkyl, alkoxyalkyl, alkylaminoalkyl and alkylamidoalkyl, wherein alkyl represents a group that contains from about 16 to about 24 carbon atoms which may be branched or straight chained and which may be saturated or unsaturated. Representative long-chain alkyl groups include tetradecyl (myristyl), hexadecyl (cetyl), octadecenyl (oleyl), octadecyl (stearyl), docosenoic (erucyl) and the derivatives of tallow, coco, soya and rapeseed oils. The preferred alkyl and alkenyl groups are alkyl and alkenyl groups having from about 16 to about 22 carbon atoms. Representative of alkylamidoalkyl is alkylamidopropyl with alkyl being as described above.

$R_2$ and $R_3$ are independently an aliphatic chain (i.e. as opposed to aromatic at the atom bonded to the quaternary nitrogen, e.g., alkyl, alkenyl, arylalkyl, hydroxyalkyl, carboxyalkyl, and hydroxyalkyl-polyoxyalkylene, e.g. hydroxyethyl-polyoxyethylene or hydroxypropyl-polyoxypropylene) having from 1 to about 30 carbon atoms, preferably from about 1 to about 20 carbon atoms, more preferably from about 1 to about 10 carbon atoms and most preferably from about 1 to about 6 carbon atoms in which the aliphatic group can be branched or straight chained, saturated or unsaturated. Preferred alkyl chains are methyl, ethyl, preferred arylalkyl is benzyl, and preferred hydroxyalkyls are hydroxyethyl or hydroxypropyl, while preferred carboxyalkyls are acetate and propionate. Preferred hydroxyalkyl-polyoxyalkylenes are hydroxyethyl-polyoxyethylene and hydroxypropyl-polyoxyethylene.

$R_4$ is a hydrocarbyl radical (e.g. alkylene) with chain length 1 to 4. Preferred are methylene or ethylene groups.

Y is $COO^-$ or $CH(OH)SO_3^-$ or $SO_3^-$.

Specific examples of suitable zwitterionic surfactants include those of the following structures:

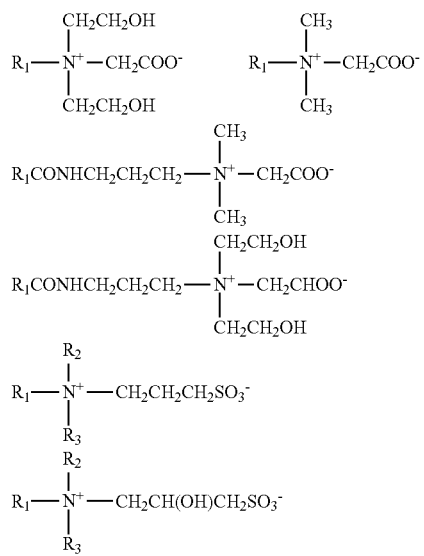

wherein $R_1$, $R_2$, $R_3$ has been previously defined herein.

Another example of a suitable zwitterionic surfactant selected is an amine oxide. This material has the following structure:

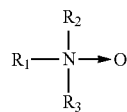

wherein $R_1$, $R_2$, and $R_3$ are as defined above.

Other representative zwitterionic surfactants include dihydroxyethyl tallow glycinate, propionates, oleamidopropyl betaine, and erucyl amidopropyl betaine.

Examples of non-polymeric viscosifying amphoteric surfactants include those represented by the following:

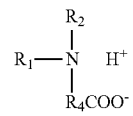

wherein $R_1$, $R_2$, and $R_4$ are the same as defined above.

Other specific examples of amphoteric surfactants include the following structures:

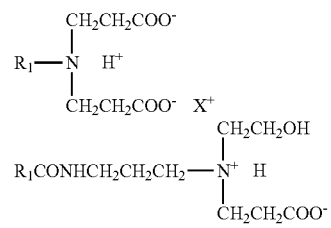

wherein $R_1$ has been previously defined herein, and $X^+$ is an inorganic cation such as $Na^+$, $K^+$, $NH_4^+$ associated with a carboxylate group or hydrogen atom in an acidic medium.

Useful zwitterionic and amphoteric surfactants include those disclosed in U.S. Pat. Nos. 6,831,108 B2 and 7,461,694 B2, which are incorporated herein by reference.

The viscous gel optionally has one or more members from the group of organic acids, organic acid salts, and inorganic acids, and inorganic salts. The organic acid or salt thereof aids in the development of increased viscosity. Since brackish water is frequently used as a viscous gel in the oilfield, salt content at some level may already present.

Useful organic acids are typically those of a sulfonic acid or a carboxylic acid. Anionic counter-ions of the organic acid salts are typically sulfonates or carboxylates. Representative of such organic molecules include aromatic sulfonates and carboxylates such as p-toluene sulfonate, naphthalene sulfonate, chlorobenzoic acid, salicylic acid, phthalic acid and the like, wherein such counter-ions are water-soluble. Most preferred are salicylate, phthalate, p-toluene sulfonate, hydroxynaphthalene carboxylates, e.g. 5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate. The organic acid or salt thereof will optionally be present in the viscous gel at from about 0.1 wt % to about 10 wt %, more typically from about 0.1 wt % to about 7 wt %, and even more typically from about 0.1 wt % to about 6 wt % based on the total weight of the viscous gel.

Useful inorganic acids and salts include water-soluble potassium, sodium, and ammonium salts, such as potassium chloride and ammonium chloride. Additionally, calcium chloride, calcium bromide and zinc halide salts may also be used. The inorganic salt is optionally present in the viscous gel at a weight concentration of from about 0.1 wt % to about 30 wt %, more typically from about 0.1 wt % to about 10 wt %, and even more typically from about 0.1 wt % to about 8 wt %. Organic salts, e.g. trimethylammonium hydrochloride and tetramethylammonium chloride, may also be used in addition to, or as a replacement for, the inorganic salts.

The component of the viscous gel that is present in the greatest concentration is water. Typically, water will be a major amount by weight of the fluid. Water is typically present in an amount by weight about 50% or more and more typically about 80% or more by weight of the fluid. The water can be from any source so long as the source contains no contaminants that are chemically or physically incompatible with the other components of the fluid (e.g., by causing undesirable precipitation). The water need not be potable and may be brackish and contain salts of such metals as sodium, potassium, calcium, zinc, magnesium, etc or other materials typical of sources of water found in or near oil fields.

Optionally, natural or synthetic polymers may be added to the viscous gel to further regulate viscosity. Useful polymers include, but are not limited to, guar and guar derivatives, xanthan, polyacrylamide (PAM), starch and starch derivatives, cellulosic derivatives, and polyacrylates.

The viscous gel may optionally contain a gas such as air, nitrogen, carbon dioxide, and natural gases to provide an energized fluid or foam. Supercritical emulsions of carbon dioxide and/or nitrogen can be also present. Supercritical fluids enhance the ability of the viscous gel to compatibilize with oil making it easier to push the oil from the matrix of the carbonate formation.

Optionally, other surfactants, polymeric or non-polymeric, can be added to the viscous gel to impart additional IFT reduction and/or modify viscosity. Such other surfactants may impact IFT and/or viscosity. Such other surfactants can be anionic, cationic, nonionic, zwitterionic/amphoterics and combinations thereof. When present, such other surfactants will preferably be present in limited amounts, i.e., about 0.5% or less, more preferably about 0.2% or less, and even more preferably 0.1% or less by weight based on the total weight of the viscous gel.

The method of the present disclosure may optionally be preceded by or succeeded by a hydraulic fracturing step to provide additional enhanced oil recovery. In hydraulic fracturing, a fracturing fluid, such as water, is injected through a wellbore and against the face of the formation at a pressure and flow rate sufficient to overcome the overburden pressure of the formation and initiate and/or extend a fracture(s) into the formation. The fracturing fluid typically carries a proppant, such as 20-40 mesh sand, bauxite, glass beads, etc., which is suspended in the fracturing fluid and transported into a fracture. The proppant prevents the formation from closing back down on itself when the pressure is released. The proppant-filled fractures provide permeable channels through which formation fluids can flow to the wellbore and thereafter be extracted or withdrawn.

The viscous gel is preferably substantially free of, i.e., without, solids, e.g., proppant materials such as sand, bauxite, glass beads, and the like. The efficacy of the viscous gel in contacting and penetrating the matrix of the carbonate formation is enhanced when it is substantially free of solids. It is foreseeable that, in the course of use, that the viscous gel will pick up or accumulate limited amounts of solids as it traverses or is conducted through the carbonate formation and reservoir.

The viscous gel affords functional advantages compared to foams heretofore used by the industry. Unlike foams, the gel-like form of the viscous gel does not dissipate quickly. Thus, enhancement of oil recovery is maintained for a substantially longer period of time.

The viscous gel affords the advantage of substantial reducing or preventing infiltration of gas from adjacent gas-bearing formations into the fracture network of the oil-bearing carbonate formation and reservoir. The reduction or prevention of gas infiltration enables the internal pressure and the carbonate formation and reservoir to be substantially maintained. The maintenance of internal pressure prevents migration or pushing down of oil within the oil-bearing formations to be minimized or prevented making the oil easier to recover.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

What is claimed is:

1. A method for enhancing recovery of oil from an oil-bearing carbonate formation within a reservoir, comprising:
   (a) introducing a viscous gel under pressure into the oil-bearing carbonate formation and
   (b) extracting the oil,
   wherein the viscous gel includes water and a non-polymeric viscosifying surfactant in an amount sufficient to provide a flooding fluid with an oil/water interfacial surface tension of about 1 mNm or less and a viscosity of about 5 cP or more of one or more non-polymeric surfactants, wherein the one or more non-polymeric surfactants is selected from the group of one or more cationic surfactants, one or more zwitterionic surfactants, one or more anionic surfactants, one or more amphoteric surfactants, and combinations thereof.

2. The method of claim 1, wherein the viscous gel is substantially free of solids.

3. The method of claim 1, wherein the viscous gel is introduced under pressure into the oil-bearing carbonate formation for one or more days, and wherein oil extraction is commenced one to ten days after the introduction has ended.

4. The method of claim 3, wherein the viscous gel is introduced under pressure into the oil-bearing carbonate formation for three to five days, and wherein oil extraction is commenced three to five days after the introduction has ended.

5. The method of claim 1, wherein the viscous gel has about 0.1 wt % to about 20 wt % of the one or more non-polymeric surfactants.

6. The method of claim 1, wherein the viscous gel has about 0.5 wt % to about 10 wt % of the one or more non-polymeric surfactants.

7. The method of claim 1, wherein the viscous gel has up to about 20 lbs/1000 gals water of organic and inorganic salts.

8. The method of claim 1, wherein the viscous gel has an amount of the one or more surfactants sufficient to provide a flooding fluid having an interfacial surface tension of about 0.1 mNm or less.

9. The method of claim 1, wherein the one or more non-polymeric surfactants has the formula

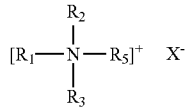

wherein $R_1$ is a hydrophobic moiety of alkyl, alkylarylalkyl, alkoxyalkyl, alkylaminoalkyl or alkylamidoalkyl, and wherein $R_1$ has from about 16 to about 22 carbon atoms and may be branched or straight-chained and saturated or unsaturated; wherein $R_2$ and $R_3$ are, independently, i) an aliphatic group or ii) an aliphatic group with an aromatic or benzylic moiety bonded therewith; wherein $R_2$, $R_3$, and $R_5$ have from 1 to about 30 atoms; wherein the aliphatic group is branched or straight-chained and saturated or unsaturated; and wherein X is suitable counter-anion, such as Cl⁻, Br⁻, and $CH_3CH_3SO_4^-$.

10. The method of claim 1, wherein the one or more non-polymeric surfactants has the formula

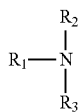

wherein $R_1$ is a hydrophobic moiety of alkyl, alkylarylalkyl, alkoxyalkyl, alkylaminoalkyl or alkylamidoalkyl, and wherein $R_1$ has from about 16 to about 22 carbon atoms and may be branched or straight-chained and saturated or unsaturated; wherein $R_2$ and $R_3$ are, independently, i) an aliphatic group or ii) an aliphatic group with an aromatic or benzylic moiety bonded therewith.

11. The method of claim 1, wherein the one or more non-polymeric surfactants comprises one or more compounds according to the formulas (I) to (V):

$$ROSO_3^- \qquad (I)$$

$$R((OCH_2CH_2)_m(OCH_2CHCH_3)_n)_pOSO_3^- \qquad (II)$$

$$RSO_3^- \qquad (III)$$

$$R((OCH_2CH_2)_{m'}(OCH_2CHCH_3)_{n'})_{p'}OCH_2CH(OH)CH_2SO_3^- \qquad (IV)$$

$$RC_6H_4-SO_3^- \qquad (V)$$

wherein R represents an alkyl, alkenyl, arylalkyl, or hydroxyalkyl group; each of m, n, m', and n' is independently an integer of from 0 to about 50 and p and p' are each integers of from 1 to about 25.

12. The method of claim 1, wherein the one or more non-polymeric surfactants has the formula

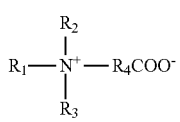

wherein $R_1$ represents a hydrophobic moiety of alkyl, alkylarylalkyl, alkoxyalkyl, alkylaminoalkyl or alkylamidoalkyl; wherein alkyl represents a group that contains from about 16 to about 24 carbon atoms that is branched or straight chained and saturated or unsaturated; wherein $R_2$ and $R_3$ are, independently, an aliphatic chain having from 1 to about 30 carbon atoms in which the aliphatic group is branched or straight chained and saturated or unsaturated; and wherein $R_4$ is a hydrocarbyl radical (e.g. alkylene) with chain length 1 to 4.

13. The method of claim 1, wherein the one or more non-polymeric viscosifying surfactants has the formula

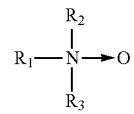

wherein $R_1$ represents a hydrophobic moiety of alkyl, alkylarylalkyl, alkoxyalkyl, alkylaminoalkyl or alkylamidoalkyl; wherein alkyl represents a group that contains from about 16 to about 24 carbon atoms that is branched or straight chained and saturated or unsaturated; wherein $R_2$ and $R_3$ are, independently, an aliphatic chain having from 1 to about 12 carbon atoms in which the aliphatic group is branched or straight chained and saturated or unsaturated.

14. The method of claim 1, wherein the one or more non-polymeric surfactants has the formula

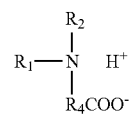

wherein $R_1$ represents a hydrophobic moiety of alkyl, alkylarylalkyl, alkoxyalkyl, alkylaminoalkyl or alkylamidoalkyl; wherein alkyl represents a group that contains from about 16 to about 24 carbon atoms that is branched or straight chained and saturated or unsaturated; wherein $R_2$ is an aliphatic chain having from 1 to about 30 carbon atoms in which the aliphatic group is branched or straight chained and saturated or unsaturated; and wherein $R_4$ is a hydrocarbyl radical with chain length 1 to 4.

15. The method of claim 1, wherein the introduction of the viscous gel is preceded or succeeded by a hydraulic fracturing step.

16. The method of claim 1, wherein the viscous gel includes about 1 wt % to about 10 wt % of one or more compounds selected from the group consisting of organic acids, organic salts, inorganic acids, and inorganic salts.

17. The method of claim 1, wherein the viscous gel further includes a gas selected from the group consisting of air, nitrogen, carbon dioxide, and natural gases.

18. The method of claim 1, wherein the viscous gel further includes a supercritical fluid selected from the group consisting of nitrogen and carbon dioxide.

* * * * *